United States Patent [19]
Liu et al.

[11] Patent Number: 6,081,543
[45] Date of Patent: Jun. 27, 2000

[54] STRETCHER-COMPRESSOR ASSEMBLY HAVING A SINGLE GRATING

[75] Inventors: Xinbing Liu, Beaverton, Oreg.; Alan Braun, Paris, France; Christopher Horvath, Irvine, Calif.

[73] Assignee: The Regents of the University of Michigan, Ann Arbor, Mich.

[21] Appl. No.: 09/079,334

[22] Filed: May 14, 1998

[51] Int. Cl.[7] .................................................... H01S 3/08
[52] U.S. Cl. ............................................................. 372/102
[58] Field of Search ............................ 372/25, 99, 102

[56] References Cited

U.S. PATENT DOCUMENTS

| | | |
|---|---|---|
| 4,750,809 | 6/1988 | Kafka et al. . |
| 5,095,487 | 3/1992 | Meyerhofer et al. . |
| 5,101,458 | 3/1992 | Spaulding et al. . |
| 5,235,606 | 8/1993 | Mourou et al. . |
| 5,329,398 | 7/1994 | Lai et al. . |
| 5,363,226 | 11/1994 | Strasser et al. . |
| 5,400,350 | 3/1995 | Galvanauskas . |
| 5,469,454 | 11/1995 | Delfyett, Jr. . |
| 5,802,085 | 9/1998 | Lefevre et al. ................... 372/102 |

OTHER PUBLICATIONS

C. Horvath, A. Braun, H. Liu, T. Juhasz, and G. Mourou, "Compact directly diode–pumped femtosecond Nd:glass chirped–pulse–amplification laser system", Optics Letters, vol. 22, No. 23, Dec. 1, 1997, pps. 1790–92.

W.J. Tomlinson and W.H. Knox, "Limits of fiber–grating optical pulse compression", Journal Optical Society of America, vol. 4, Sep. 1987, pps. 1404–11.

*Primary Examiner*—Rodney Bovernick
*Assistant Examiner*—Robert E. Wise
*Attorney, Agent, or Firm*—Young & Basile, P.C.

[57] ABSTRACT

The invention provides a compact, combined stretcher-compressor assembly which utilizes a single grating element. The single grating element is preferably a holographic transmission grating element. The grating element has first and second surfaces which are opposed major surfaces with a thickness between the surfaces. The grating pattern is patterned in or on the grating element. The grating element is arranged in the assembly to receive a beam for stretching laser pulses in a stretcher beam path, and in the same arrangement, to receive a beam for compressing laser beam pulses in a compressor beam path. The stretcher and compressor beam paths pass through the single grating element. Respective reflecting means are arranged to provide a desired number of passes through the grating element by the stretcher beam path, and through the grating element by the compressor beam path.

20 Claims, 8 Drawing Sheets

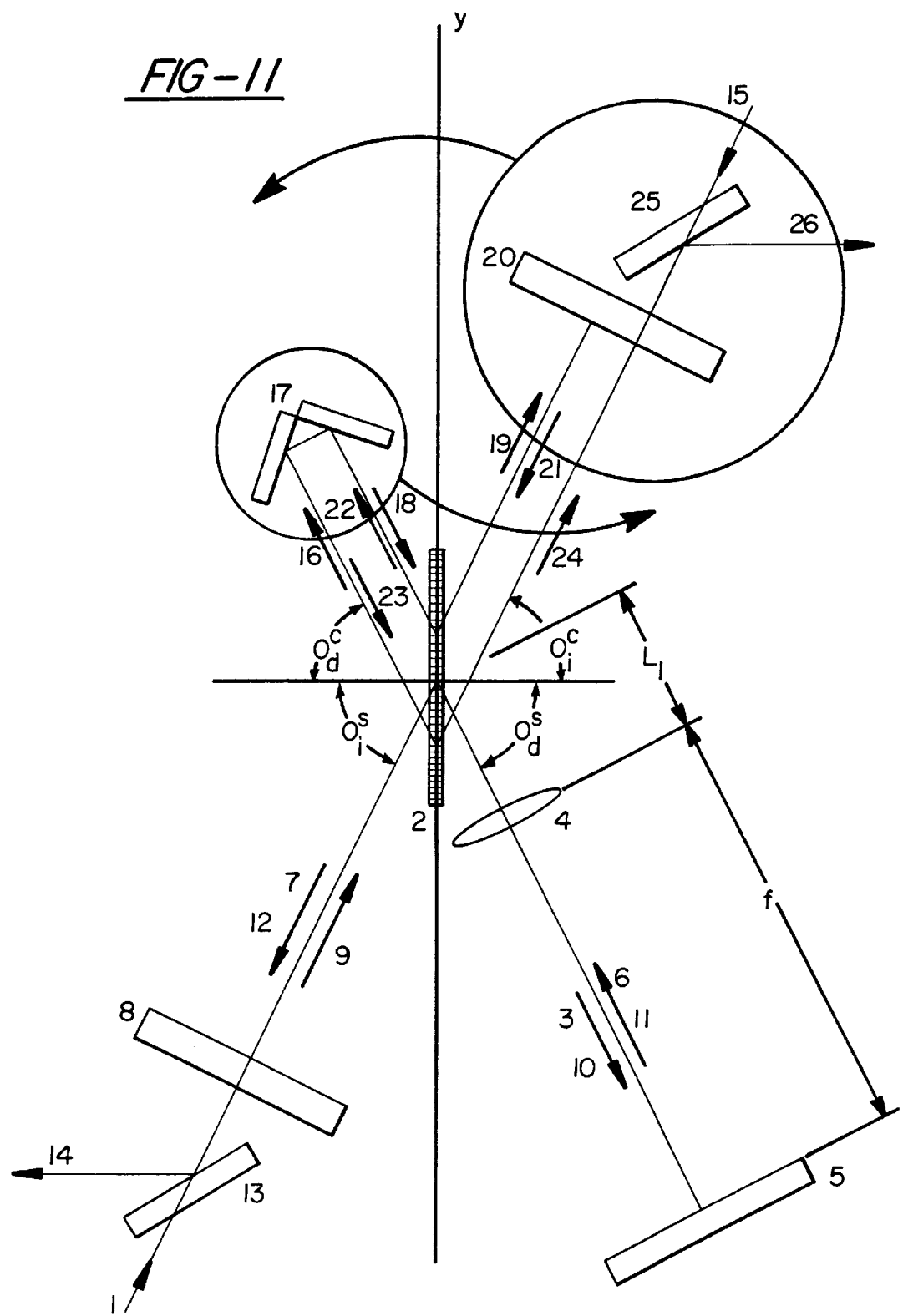

STRETCHER-COMPRESSOR ASSEMBLY HAVING A SINGLE GRATING

FIELD OF THE INVENTION

This invention relates generally to the field of laser technology, and more particularly to optical pulse temporal stretching and compressing to a desired duration.

BACKGROUND OF THE INVENTION

The amplification of ultrashort laser pulses involves pulse width manipulation by chirped-pulse amplification (CPA). See U.S. Pat. No. 5,235,606 which is incorporated herein by reference in its entirety. A train of ultrashort pulses, on the order of less than one picosecond and of low pulse energy, are generated from an ultrafast laser oscillator. One pulse from the pulse train is selected as a seed pulse to be amplified to gain pulse energy in a laser amplifier. When amplifying the ultrashort pulse in a solid-state gain media, the pulse is stretched (chirped) in time before amplification. This is to avoid damage to the gain medium and other optical components in the amplifier that would result due to high laser intensity if an unstretched pulse were amplified. After amplification, the stretched pulse is recompressed, often back to its initial ultrashort pulse state by a pulse compressor. Therefore, an amplified ultrashort-pulse laser system based on chirped-pulse amplification consists of 4 basic elements: oscillator, stretcher, amplifier, and compressor. This is fully described in U.S. Pat. No. 5,235,606 and illustrated in FIG. 1 attached hereto.

The pulse stretcher and amplifier are key elements of a CPA laser system, and are what set it apart from other amplified laser systems. The most common pulse stretcher and amplifier use diffraction gratings for pulse width manipulation. The stretcher uses the dispersive properties of the diffraction grating to disperse the many different frequency components that make up the ultrashort pulse into different optical paths. Each path has different optical path length. At the output of the stretcher, all the frequency components are recombined to have the same optical path again. Because the different frequency components have different optical path in the stretcher, they arrive at the output at different times, since the speed of light in air is constant for these frequency components. The frequency components that have longer optical paths will arrive at the output later than those that have shorter optical paths, therefore the output pulse is stretched in time. Normally in a stretcher, the lower frequency components (longer wavelengths) have shorter optical paths than higher frequency components (shorter wavelengths), so they make up the leading edge of the stretched pulse, while higher frequency components form the trailing edge. In the compressor, the optical paths are reversed from the stretcher: lower frequency components take the longer optical paths, while higher frequency components have the shorter paths, canceling the pulse stretching effect of the stretcher. The output from the compressor is typically a pulse with the original ultrashort pulse width, although a different duration is also possible.

There are many implementations of pulse stretcher and compressor. FIG. 2 shows a conventional stretcher having a pair of gratings. FIG. 3 shows a conventional compressor having a pair of gratings. Conventional applications requiring a source of amplified ultrashort pulses are mainly reliant on Ti:sapphire-based lasers. Typically these regenerative amplifier systems produce sub-100-fs pulses with energies in the millijoule range and repetition rates of 1 kHz. However, because of their large size and costly pump sources, these Ti:sapphire amplifiers are unattractive for many commercial, medical and industrial uses.

Recent progress in high-power diode-laser technology and the advent of new laser materials such as Cr:LiSAF and Cr:LiSGaF have accelerated the development of cost-effective all-solid-state femtosecond oscillators, which are now beginning to replace traditional gas-laser-pumped femtosecond lasers such as dye or Ti:sapphire oscillators. However, little success has been achieved in replacing traditional femtosecond regenerative amplifiers with the new directly diode-pumped laser materials. These materials are limited by the low power of the currently available 670-nm diodes, their energy-storage capabilities (with a relatively low upper-state lifetime of ~67 $\mu$s), and severe thermal-lifetime quenching in Cr:LiSAF3.

There is a continuing need for improvements in apparatus and methods for generating high-power, ultrashort laser pulses. There is also a need to simplify the laser systems so that when a change in the laser wavelength is required, precise readjustment is less burdensome. It is also desirable to eliminate the problem of strictly matching grating pairs required for conventional stretcher and compressor, as illustrated in FIGS. 2 and 3 herein.

SUMMARY OF THE INVENTION

The invention provides a compact, combined stretcher-compressor assembly which utilizes a single grating element. The single grating element is preferably a holographic transmission grating element. The grating element has first and second surfaces which are opposed major surfaces with a thickness between the surfaces. The grating pattern is patterned in or on the grating element. The grating element is arranged in the assembly to receive a beam for stretching laser pulses in a stretcher beam path, and in the same arrangement, to receive a beam for compressing laser beam pulses in a compressor beam path. The stretcher and compressor beam paths pass through the single grating element. Respective reflecting means are arranged to provide a desired number of passes through the grating element by the stretcher beam path, and through the grating element by the compressor beam path.

The grating element and the reflecting means associated with the stretcher define the stretcher beam path which first passes through the grating element to and through the first surface, is diffracted, and then passes out through the second surface. A first reflecting means faces the second surface and redirects the diffracted beam back through the grating element, and to second reflecting means facing the first surface of the grating element, to provide one or more additional passes through the grating element.

The compressor portion of the assembly may be arranged in one of two ways with respect to the stretcher portion. In a first alternative, the compressor section is arranged to provide multiple passes through the grating element, where the first pass enters the grating element at the same surface as the first pass of the stretcher. That is, the compressor beam first pass enters the grating through the first surface, as does the stretcher beam first pass. In an alternative embodiment, the compressor beam path first passes through the grating element by entering at the second (opposite) surface. In other words, the input stretcher beam and the input compressor beam may each enter the grating element through the same surface; or the input stretcher beam and the input compressor beam may enter the grating element from opposite surfaces.

In the first alternative, the compressor beam path first passes through the grating element from the first surface to the second surface. Reflecting means facing the second surface redirect the deflected beam back through the grating element. In the alternative arrangement, the compressor beam path first passes through the grating element from the second surface to the first surface, then the diffracted beam is redirected back through the grating element. In the case where the input stretcher beam and the input compressor beam each enter the grating through the same surface, they enter from different directions relative to the surface of the grating element.

Desirably, the assembly is arranged to provide at least three passes through the grating element by the stretcher beam, and at least three passes through the grating element by the compressor beam. It is preferred to have at least four passes, respectively, by the stretcher and compressor beam paths. Preferably, after the first pass of the compressor beam through the grating element, it is redirected back through the grating element by a retroreflector, preferably roof mirror or prism. The system utilizes retroreflectors, roof mirror, prism and/or tilted (angled) arrangement of reflecting means with respect to the grating surface to provide offset beam paths. That is, reflected or deviated beam follows a path displaced from the path of the incident beam. Thus, multiple passes through the grating element are possible without interference. It is preferred that the assembly further comprise focusing means in the stretcher beam path between the grating element and the first reflecting means, which redirects the beam back through the grating element. The focusing means is aligned in the path at a distance L from the grating element, and a distance f from the reflecting means, where f is the focal length of the focusing means. In the arrangement described here, it is possible to minimize the distance L to provide a very compact and efficient assembly.

An advantage of the present assembly, utilizing transmission mode, is the ability to have the stretcher beam path and the compressor beam path overlap. This further enhances compactness. Not only is it possible for the beam paths to overlap, it is possible to have the stretcher beam path define a region in the grating element which is within a region defined by the compressor beam path. In other words, the stretcher beam path passes through the grating element in a first region of the grating element; and the compressor beam path passes through the grating element in a second region. The first and second regions may overlap. The first region may be within the second region. Even more advantageously, the first and second regions may coincide, thus there is the ability to arrange the assembly to provide essentially complete overlap of the two regions. This leads to a very efficient and compact combined assembly. Advantageously, the very compact assembly of the invention is operable to provide a diffraction efficiency which is at least as great as the diffraction efficiency obtained by comparative conventional grating elements arranged side by side, or spaced apart. The grating element itself is very compact and is prepared from dielectric materials forming a composite body. A first layer of dielectric material overlies a second layer. The grating is preferably patterned on an inner surface of one of the layers.

The potential for commercial application of the combined stretcher and compressor assembly of the invention is considerable, including the elimination of conventional separate stretchers and compressors, in order to reduce the size of laser systems and increase their use and affordability. The single grating element, usable as both stretcher and compressor, provides advantages of economy, commercial adaptability, ease of set-up, and ease of alignability.

These and other objects, features, and advantages of the invention will become apparent from the following description of the preferred embodiments, claims, and accompanying drawings.

BRIEF DESCRIPTION OF DRAWINGS

FIG. 11 is a schematic representation of another desirable embodiment of a combined stretcher-compressor assembly according to the invention. The assembly includes a preferred single grating element operating in transmission mode, with associated reflecting means and focusing means. The Y axis is an axis of symmetry reference with respect to encircled elements and arrows to show alternative arrangement of compressor-related reflecting means.

DETAILED DESCRIPTION OF THE PREFERRED EMBODIMENTS

Figure 1:
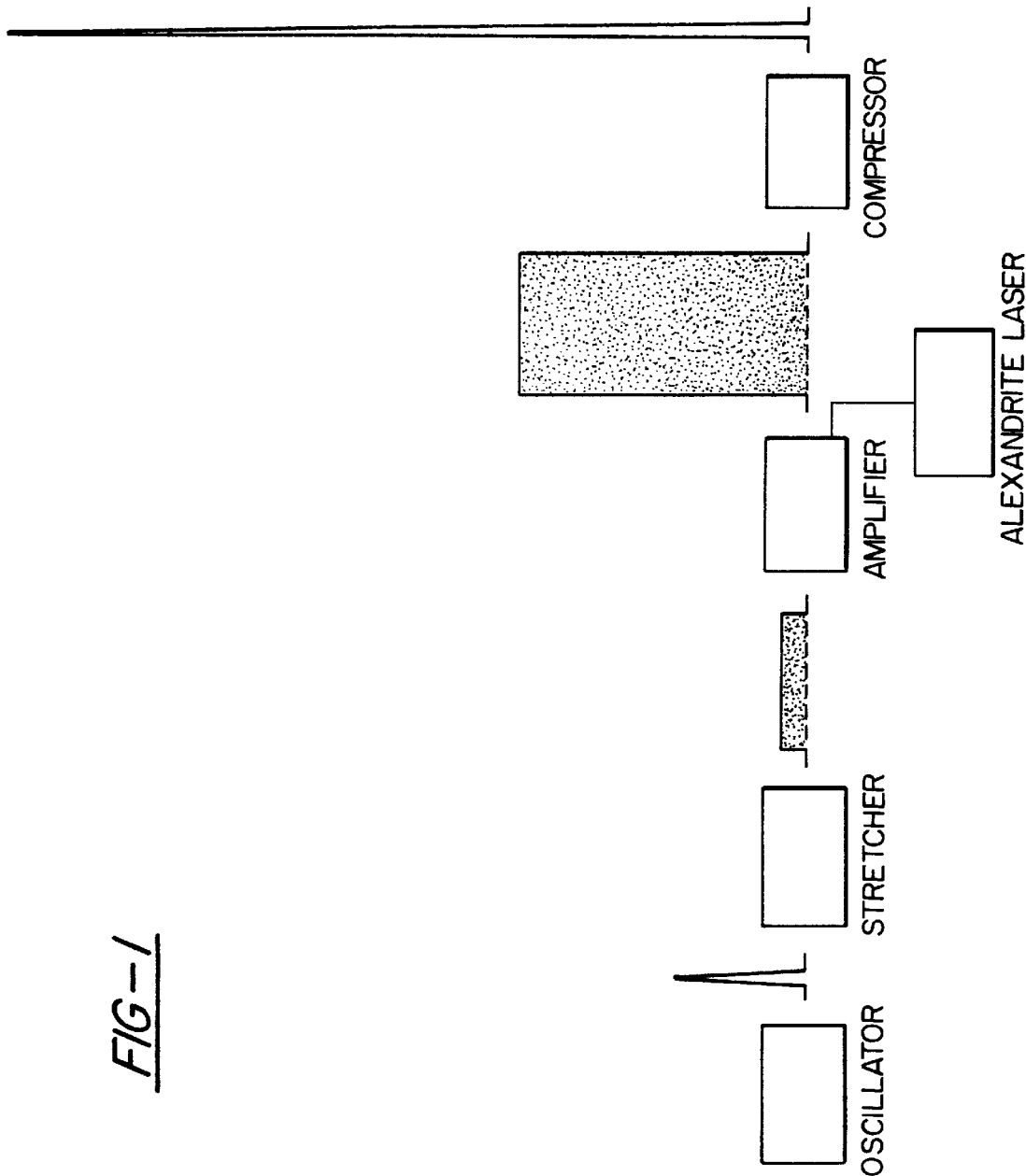
FIG. 1 is a schematic representation of a chirped pulse amplification arrangement. The relevant components are shown as open boxes and labeled. The condition of the pulse is shown schematically between the components. A peak shape represents an initial pre-stretched pulse; stretched pulse is represented by shaded flat shape; stretched and amplified pulse by shaded large column; and recompressed pulse by elongate sharp peak shape.
Figure 2:
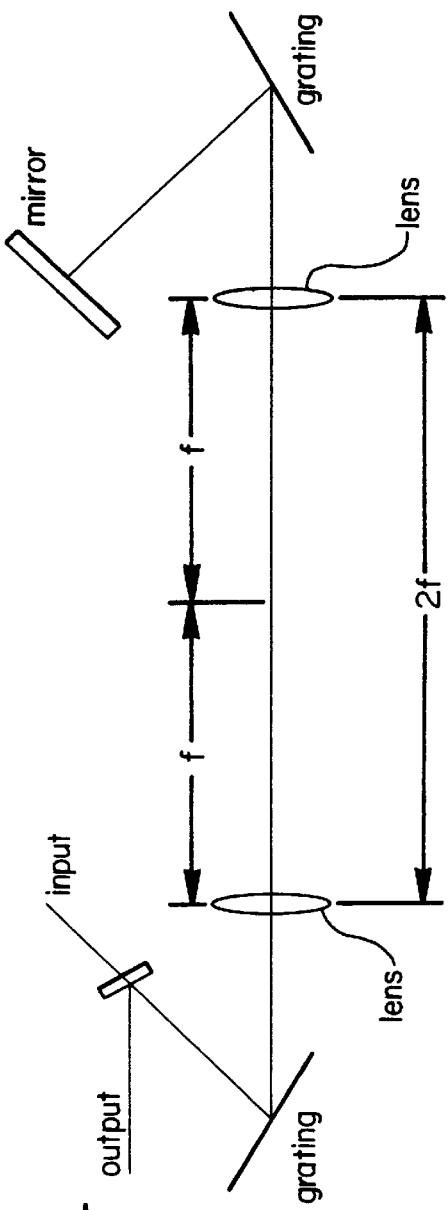
FIG. 2 is a schematic representation of a stretcher comprising mirrors and a pair of gratings arranged to provide positive group velocity dispersion. Focusing lens are also shown, having respective focal length represented by the small letter f.
Figure 3:
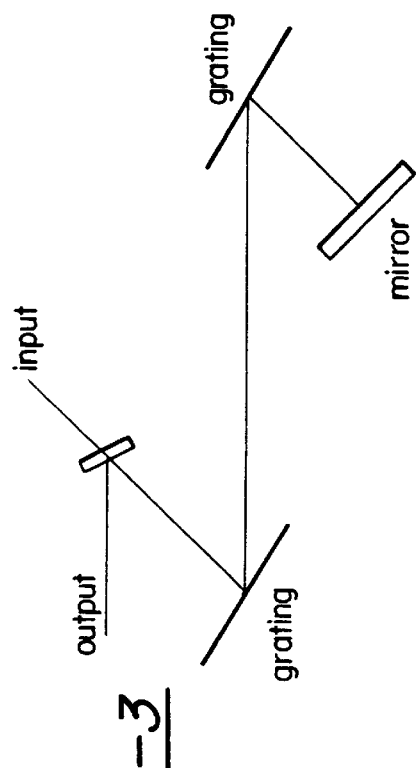
FIG. 3 shows a schematic representation of a conventional compressor consisting of a pair of gratings and associated mirrors, arranged to provide negative group velocity dispersion.
Figure 4:
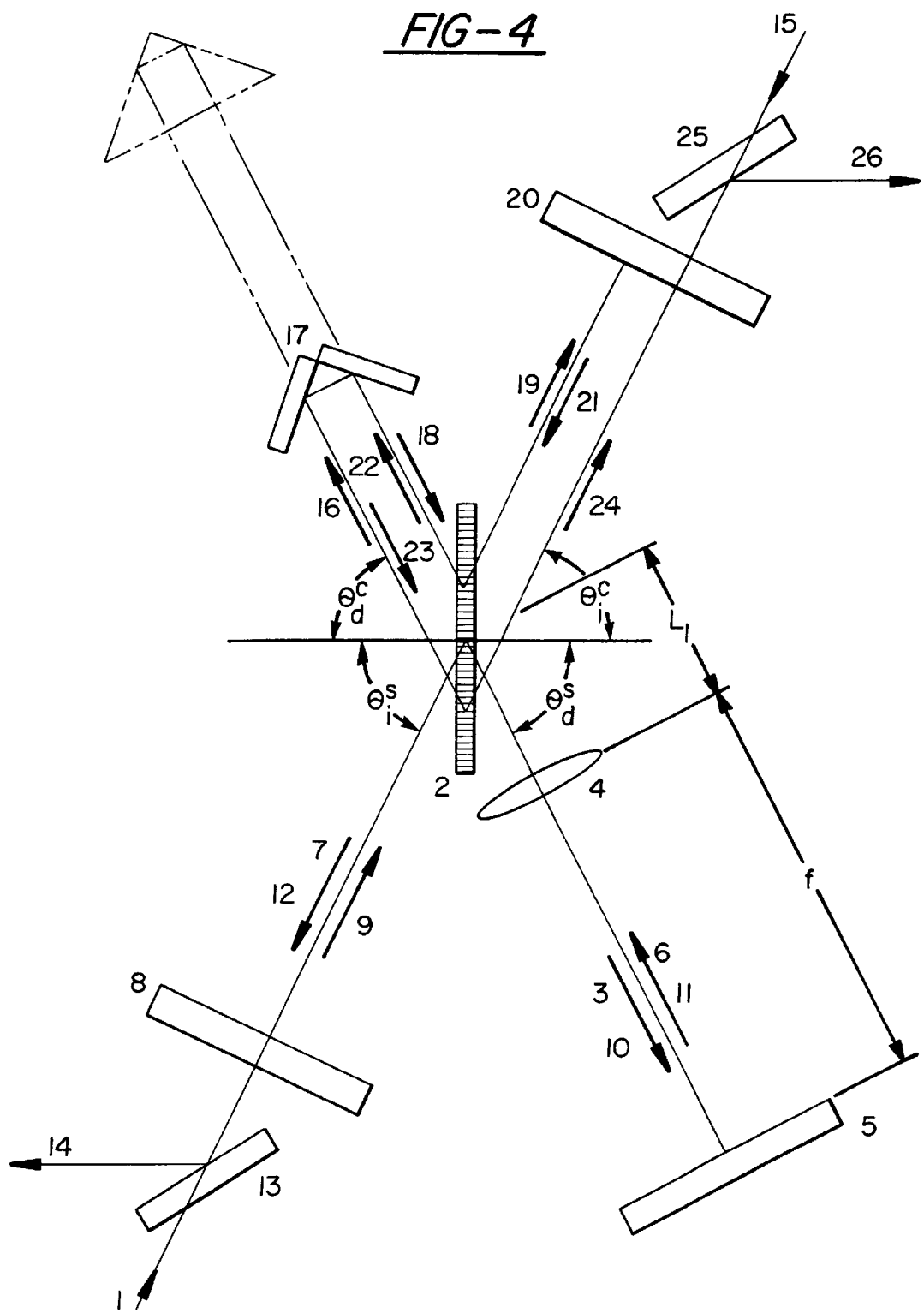
FIG. 4 is a schematic representation of a desirable embodiment of a combined stretcher-compressor assembly according to the invention. The assembly includes a preferred single grating element operating in transmission mode, with associated reflecting means and focusing means.

The present invention provides a combined stretcher-compressor using a single grating, preferably a holographic transmission grating. FIG. 4 shows a combined stretcher-compressor assembly which includes the single grating of the invention. It is compact, operative at Littrow angle, and does not require a large vertical dimension (length) of the grating. Because it works at Littrow angle, it is very efficient. For the stretcher part, input beam 1 strikes the transmission grating 2 at incident angle $\theta_{si}$. For highest diffraction efficiency, $\theta_{si}$ is preferably the Littrow angle:

$$\theta_{si}=\arcsin(\lambda/2d),$$

where $\lambda$ is the central wavelength of the laser pulse, d is the grating period. The diffracted beam 3 leaves the grating at angle $\theta_{sd}$ to the opposite side of the grating. 2. For Littrow incident angle, $\theta_{sd}=\theta_{si}$. The diffracted beam 3 then goes to lens 4, placed at a distance $L_i$ from the grating. After lens 4, the diffracted beam 4 strikes mirror 5, placed in the focal plane of lens 4. After reflecting from mirror 5, beam 6 goes back along the same path to grating 2. Beam 6 is diffracted again by grating 2 at diffraction angle $\theta_{si}$ to beam 7. Mirror 5 is slightly tilted vertically so the beam 7 has a vertical displacement to beam 1. Beam 7 strikes mirror 8, placed above (or below) beam 1. Beam 9 is reflected from mirror 8, and traces back through the system again in beams 10–12. Mirror 8 also has a slight vertical tilt, so beam 12 has a vertical displacement from beam 1, and is reflected by mirror 13 placed below (or above) beam 1 to become beam 14. Alternatively, mirror 8 is a roof mirror, that is, a set of two mirrors, that effectively displaces the beam up. Beam 14 is the output beam from the stretcher.

For the compressor, beam 15 is the output beam from the laser amplifier and directed to grating 2. The incident angle is $\theta_{ci}$ Normally $\theta_{ci}=\theta_{si}$, although slightly different incident angles may be used for higher order dispersion compensation purposes. The diffracted beam 16 with a diffraction angle $\theta_{cd}$ strikes a 90° roof mirror 17. Reflected beam 18 from the roof mirror is again diffracted by grating 2 to beam 19. The roof mirror 17 has a slight vertical tilt so beam 19 is displaced vertically from beam 15. Beam 19 strikes mirror 20, placed above (or below) beam 15, then traces back through the system in beams 21–24. Mirror 20 has a slight vertical tilt so beam 24 has a vertical displacement from beam 15. Alternatively, mirror 20 is a roof mirror, that is, a set of two mirrors, that effectively displaces the beam up. Mirror 25 placed below (or above) beam 15 reflects beam 24 to output beam 26. Note also that it is possible to replace a roof mirror (retroreflector) with a prism as shown in the inset to FIG. 4. Thus, a variety of reflecting means are usable in the system to achieve desired beam paths.

The compact single transmission grating stretcher-compressor is usable in a CPA laser system to produce high energy, ultra-short pulses. An exemplary and preferred system will now be described. The preferred system is an all-solid-state longitudinally diode-pumped Nd:glass chirped-pulse-amplification laser system producing pulses of 50-MW peak power. The diode-pumped Nd:glass regenerative amplifier produces pulses with energies as high as 56 $\mu$J at a 1-kHz repetition rate and pulse durations as short as 450 fs after compression in the compact single holographic-transmission-grating stretcher-compressor arrangement of the invention. Spectral gain shaping extends the bandwidth that was supported in the low-gain amplifier. This system provides the highest peak and average power obtainable from a directly diode-pumped femtosecond laser.

This system uses Nd:glass, with an upper-level lifetime of ~300 $\mu$s and a strong absorption band around 800 nm, where high-power diode lasers are readily available. It possesses markedly better energy storage capabilities than Cr:LiSAF.

Further, even with the relatively narrow emission band of Nd:glass (30 nm FWHM) (compared with that of Cr:LiSAF (200 nm)), the direct generation of nearly bandwidth-limited 60-fs pulses is possible from the diode-pumped Nd:glass oscillator mode locked with an antiresonant Fabry-Perot semiconductor saturable absorber (AFPSA). The availability of short seed pulses as well as other favorable characteristics of Nd:glass, such as good energy storage, easy fabrication, and low cost, make this material preferred for compact high-power directly diode-pumped oscillator-regenerative-amplifier systems for the generation of high-energy laser pulses in the 100-fs pulse-duration range.

Figure 5:
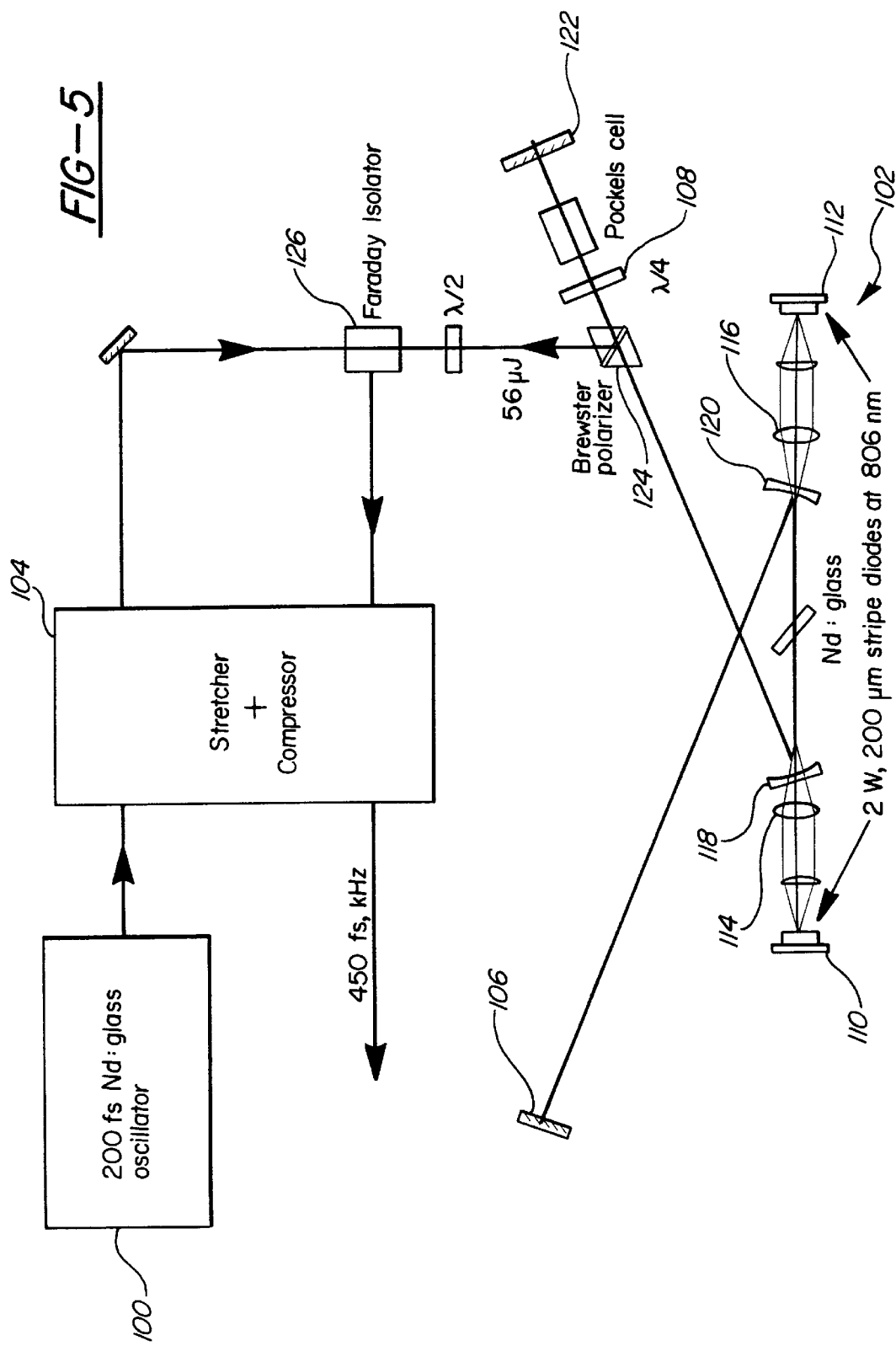
FIG. 5 is a schematic representation of a system for producing high energy ultrashort pulses which comprises a diode-pumped Nd:glass regenerative amplifier. The system also includes the preferred unitary grating for stretching and compressing, similar to FIG. 4, and as further described with respect to FIG. 8.

The compact longitudinally diode-pumped all-solid-state Nd:glass oscillator-regenerative-amplifier system capable of generating pulses of ~50-MW peak power at repetition rates in the kilohertz range is shown in FIG. 5. It includes a complete directly diode-pumped mode-locked oscillator 100 and regenerative amplifier 102, along with a compact stretcher-compressor assembly 104, based on a single transmission grating. (See FIGS. 4 and 8). An air-gap etalon for regenerative gain shaping is also used, whereby the supported bandwidth in this low-gain amplifier is increased.

The system starts with the Nd:glass oscillator 100 that utilizes an x-fold cavity with mode locking achieved by an AFPSA sample. The 4-mm-long silicate glass used in the setup was 3% doped with neodymium, and the diode laser (SDL-2360; 1.2 W from a single-stripe 100 $\mu$m×1 $\mu$m emitting aperture), with an emission wavelength of 807 nm, was centered on the absorption peak of the Nd:silicate sample, resulting in an absorption depth of ~2 mm.

Self-starting mode locking was achieved when the oscillator was pumped with a single 1.2-W laser diode (700-mW absorbed pump power). The SF10 glass-type prisms were separated by 26 cm, and the beam diameter on the AFPSA was calculated to be 55 $\mu$m. With a 0.7% output coupler in the prism arm, the output power was measured to be 30 mW. By adding a second pump diode laser to the setup, the output power was increased to 90 mW. With single-diode pumping, the pulse duration was measured to be ~190 fs, with a bandwidth of 9 nm centered at a wavelength of 1.062 $\mu$m, slightly shifted off the gain peak (1.061 $\mu$m) by the mode-locking process. Before seeding into the diode-pumped regenerative amplifier, the pulses were stretched to ~120 ps with a 1700-line/mm holographic-transmission grating 130 in a compact assembly 104 that was simultaneously used as the compressor. (See FIGS. 4 and 8 for details).

The Nd:silicate regenerative amplifier 102, shown in FIG. 5, utilizes an x-fold cavity similar to the one used for the oscillator 100. The injected seed pulse was focused into the gain medium by two mirrors 106, 108 of 100-mm radius of curvature. The 3%-doped Nd:glass absorbed 80% of the pump light generated by two 200-$\mu$m-stripe 2-W diode lasers 110, 112, each emitting at 807 nm. The fast divergence of the diode laser (sagittal plane) was collimated by a fiber lens attached to the emitting surface. Although the fiber lens introduced considerable losses into the diode-laser beam (only 1.3 W of diode-laser power was measured after the lens), it provided excellent focus of the pump beam, with a measured $M_y^2=1.5$. (In the tangential plane the $M_x^2$ value was measured to be 34.) The focusing geometry consisted of two spherical lenses 114, 116 to image the pump beam into the Nd:glass through the curved cavity mirrors 118, 120 with a demagnification factor of 1.4 (see FIG. 5). This resulted in a pump fluence at the face of the gain media of 8 $J/cm^2$; however, the corresponding small-signal gain was much less because of the strong divergence of the pump source.

Figure 6:
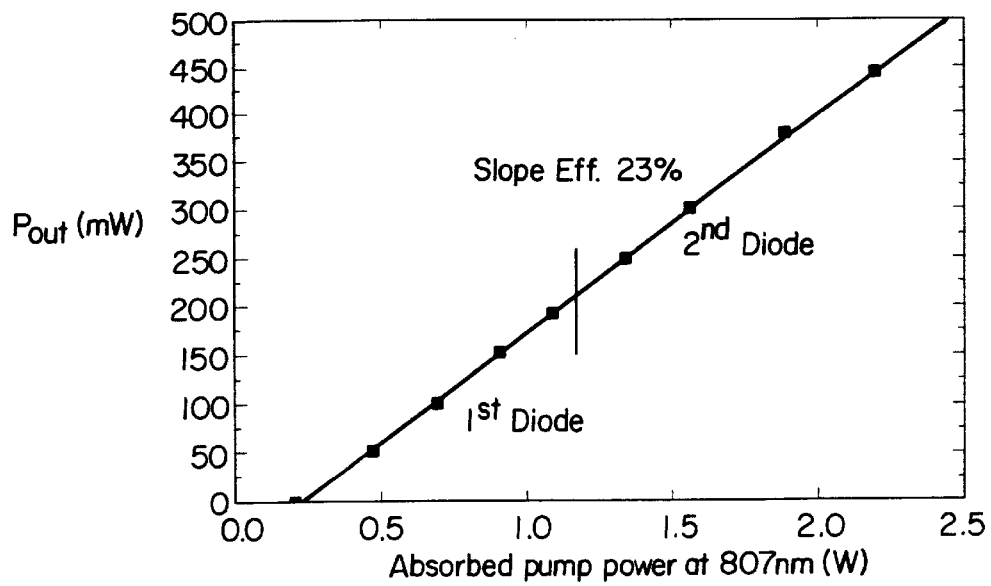
FIG. 6 shows the Cw output power of the Nd:glass amplifier cavity (of FIG. 5) as a function of the absorbed pump power measured with a T=5.5% output coupler.

In an empty cavity as much as 500 mW of output power is achieved in the cw multimode beam with a T=5.5% output coupler. FIG. 6 shows the output power of the cw empty cavity as a function of pump power. A slope efficiency of 23% was measured from the figure. Here the thermal limits were not reached, and therefore higher pump powers could be used.

The regenerative amplifier was constructed by placing a LiNbO$_3$ Pockels cell 122 and a low-loss Brewster-cut-cube polarizer 124 into the cavity. Stable laser operation was observed when the laser was Q switched and cavity dumped from 100-Hz to 8-kHz repetition rates. Without injection, the buildup time of the Q-switched pulse was 650 ns. When the amplifier was pumped with only one diode, the buildup time increased to 1 $\mu$s, and a smaller second Q-switched pulse was observed at 1.4 $\mu$s; this pulse corresponded to the multimode beam structure seen at the output. The higher-order cavity modes could be eliminated with proper alignment of the cavity and early pulse dumping, as the higher cavity modes have a longer buildup time owing to their lower gain and higher losses. Also, the higher cavity modes could be eliminated by the insertion of an intracavity pinhole.

A round-trip small-signal gain of 1.4 was measured by use of seed pulses from the oscillator in a double-pass arrangement. In the optimal case, for a TEM$_{oo}$ mode with weak higher-order mode wings, the energy of the cavity-dumped Q-switch pulse was measured to be 56 $\mu$J at a repetition rate of 1 kHz.

Stretched pulses from the output of the oscillator 100 were injected into the regenerative amplifier after they passed a Faraday isolator 126, which provided a means to separate the output pulses from the injection-beam line. The buildup time of the seeded regenerative amplifier was 450 ns (approximately 55 round trips). The stability of amplified pulses was excellent, with <2% peak-to-peak pulse amplitude fluctuations. The maximum output pulse energy was 56 $\mu$J, with an amplified pulse bandwidth of 4 nm.

Figure 7:
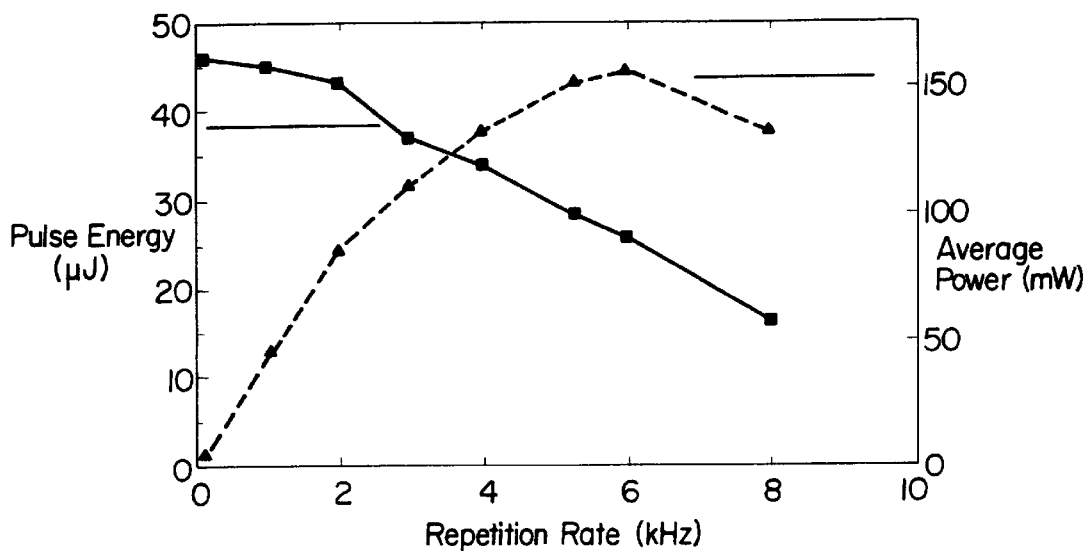
FIG. 7 shows the pulse energy and average power extracted from the regenerative amplifier (of FIG. 5) as a function of repetition rate.

FIG. 7 displays the extracted pulse energy as well as the average power of the regenerative amplifier as a function of the repetition rate. The buildup time increased and the pulse energy decreased as the repetition rate exceeded ~1 kHz, as the pumping time became shorter than the upper-level lifetime. Simulations written to investigate the effect of the repetition rate on the pulse energy in the case of cw-pumped regenerative amplifiers, specifically diode-pumped Nd:glass, were published recently.

Figure 8:
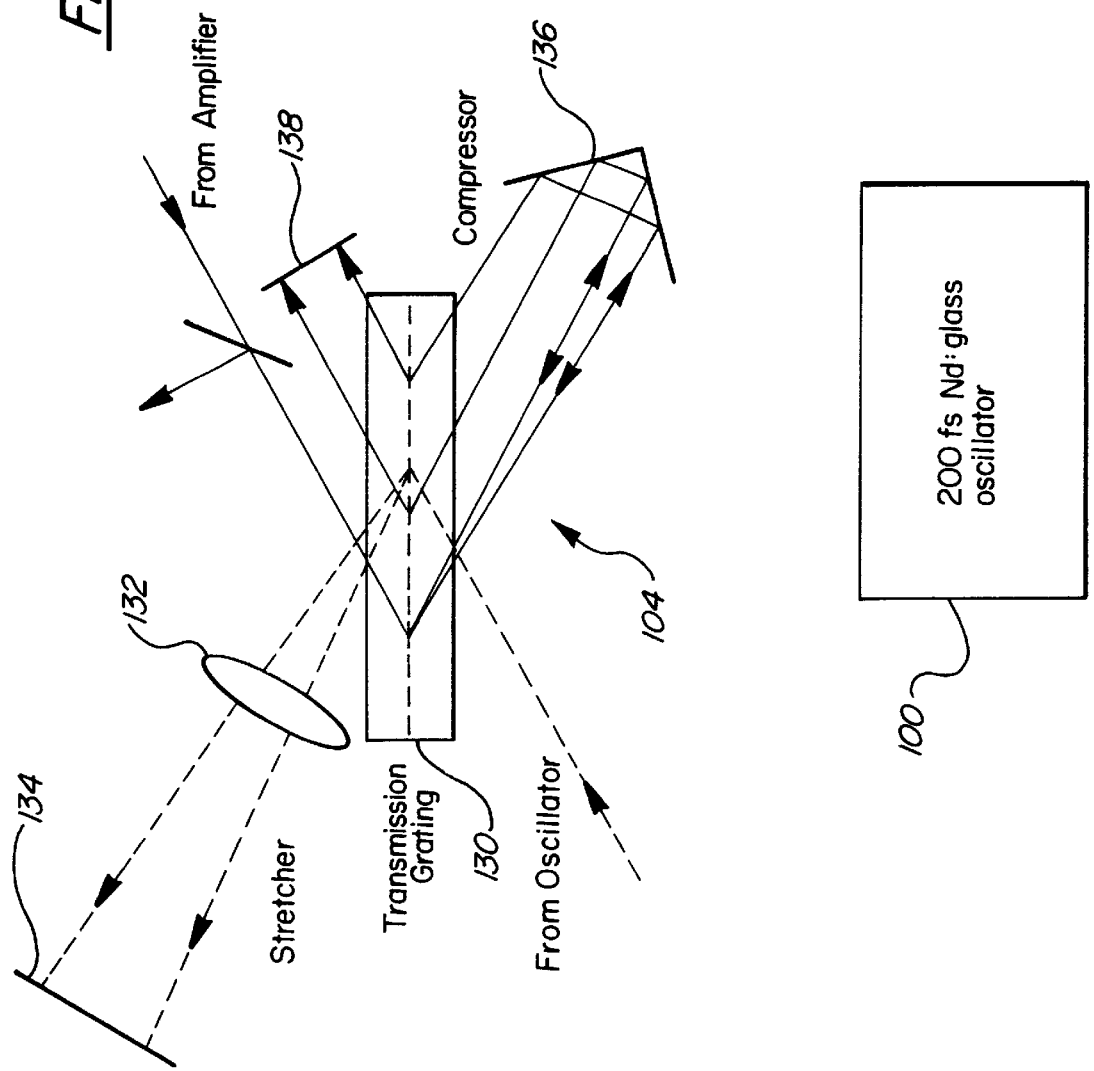
FIG. 8 is a schematic representation of the single transmission grating of the invention which permits a compact stretcher (dashed lines)-compressor (solid lines) geometry. For simplicity, the full beam path through the stretcher is not shown, since detail was previously given with respect to FIG. 4.

The amplified pulses were compressed in the stretcher-compressor assembly 104 having the single transmission grating 130 as the stretcher and compressor (see FIG. 8). There are several advantages to using transmission gratings in the stretcher-compressor. The stretcher-compressor assembly 104 of FIG. 8 is similar to the combined stretcher-compressor assembly fully described with respect to FIG. 4. Returning to the single transmission grating stretcher-compressor assembly of FIG. 8, the beam to be stretched follows a dashed line path into, in, and out of the stretcher. The beam to be compressed follows a solid line path into, in, and out of the compressor. The beam from the oscillator for stretching passes through the transmission grating 130, focusing lens 132, and is reflected by reflecting means 134. The beam from the amplifier, which is to be compressed, follows the solid line through transmission grating 130 and is reflected by 90° roof mirror 136 and reflecting means 138. For simplicity, the full-beam path through the stretcher is not shown, as it was fully described in FIG. 4. Each reflecting means 134, 136 and 138 is selected to provide multiple passes through the grating element 130. At the same time, the reflecting means are arranged to provide displacement of certain paths with respect to one another, as previously described for FIG. 4.

Advantageously, this grating is operable at the Littrow angle, therefore high single-pass diffraction efficiencies can be achieved (as much as 95% in this case; overall compressor efficiency of 70%). Transmission gratings have a long lifetime, as the grating is protected from adverse environmental conditions and the antireflection-coated surfaces are simple to clean. Further, since both sides of the transmission grating can be used, large stretching ratios are possible in a compact arrangement (f=20 cm), and the footprint of this stretcher-compressor when a single grating was used was only 30 cm×50 cm.

Figure 9:
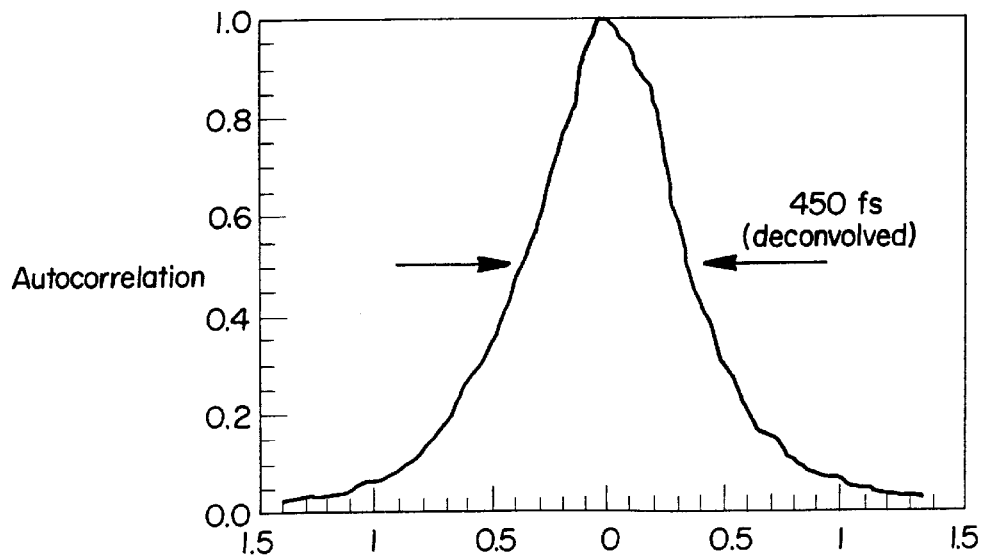
FIG. 9 shows the autocorrelation of the compressed pulse.

Because of the bandwidth of the amplified spectrum of this system, the incident angles into the stretcher and compressor could be matched without noticeable effects from uncompensated third-order dispersion. The compressed pulse duration was measured to be 450 fs, with an amplified spectral bandwidth of 4 nm. The autocorrelation trace of the compressed pulse is shown in FIG. 9.

Figure 10:
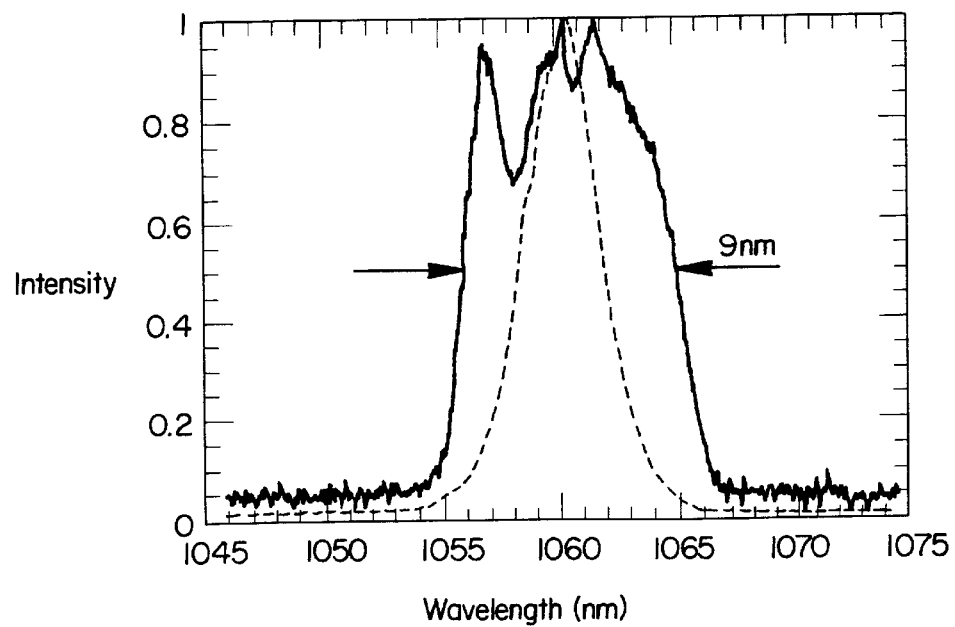
FIG. 10 shows the effect of the etalon, whereby the etalon formed by the air gap between two parallel windows increased the amplified spectral bandwidth from 4 nm (dashed curve) to 9 nm (FWHM, full width half max).

Bandwidth-narrowing effects owing to strong gain narrowing experienced during the amplification processes are apparent in this system. The amplified bandwidth of the seeded pulses can be increased by use of an intracavity etalon as a spectrally dependent filter, which suppresses the gain peak of the Nd:glass emission spectrum. This technique was previously used in a high-gain Ti:sapphire regenerative amplifier, and its feasibility for low-gain systems was proven here. The etalon was formed by the air gap between two plane glass substrates placed parallel to each other, separated by ~110 $\mu$m (free spectral range, ~5 nm) and rotated to an angle of ~10° to the beam. The outer sides of the substrates were antireflection coated, and the best results were shown when the inner sides had one window uncoated (R≈4%) and the other antireflection coated. By rotating the glass substrates, it was possible to control the modulation depth, and the free spectral range could be adjusted by separation of the substrates. With this technique the spectral gain profile was more homogeneous over the seeded pulse spectrum, so the gain-narrowing effect became weaker. FIG. 10 shows an increase in the amplified spectrum from 4 to 9 nm (FWHM, full width at half max). However, due to the shape of this broadened spectrum, the resulting Fourier-transformed pulse duration was only 30% less than that of the unshaped spectrum. Further, because of the low gain of this amplifier, the losses from the etalon reduced the overall extracted pulse energy by 60%. For the current use of the laser, the system is run without inclusion of the etalon.

After compression, as much as 23 $\mu$J of energy per pulse was available at 1-kHz repetition rates (without the etalon), with a majority of the losses coming from the Faraday isolator system 126 and the compressor 104. White-light generation and efficient plasma-mediated ablation in different biological tissues were demonstrated with this laser system.

This example demonstrated that a directly diode-pumped Nd:glass oscillator-amplifier system is capable of generating femtosecond pulses with energies as great as 56 $\mu$J at kilohertz repetition rates. The compact size, high stability and reliability, and low cost of the integral single stretcher-compressor coupled with the diode-pumped Nd:glass system make it this system uniquely adaptable for many commercial, medical and industrial uses.

The stretcher-compressor assembly of the invention is usable in a variety of configurations, the above example is a sample, and the invention is not limited thereby. In this regard, the invention is clearly not limited to $\theta_i$ being Littrow angle, according to the relationship between $\theta_i$, $\theta_d$, $\lambda$ and d, as described earlier. If other than Littrow angle is desired, relationships between parameters are defined by conventional, known equations, such as Sin $\theta_d$=m $\lambda$/d−n Sin $\theta_i$, which relates the above-mentioned $\theta_i$, $\theta_d$, $\lambda$ and d, to m (diffraction order) and n (index of refraction of the dielectric).

The invention is also not limited to any particular grating line spacing, wavelength, or incident angle. A variety of combinations are usable, for example, 1,000–2,400 lines per millimeter (1/mm); $\lambda$ being 700 nanometers to 2 microns; and incident angle, $\theta_i$, being on the order of 10° to 80°. The transmission grating may be patterned on the surface of the dielectric. However, it is best to protect it with a dielectric cover layer. In that regard, the single grating element may be in the form of a composite body having a first layer of dielectric material, a second layer of dielectric material which overlies the first layer, and the grating patterned on an inner surface of one of the dielectric layers. The invention has been described with respect to a convenient, relatively planar configuration, which is most practical for commercial use. The invention is not, however, limited to any particular body form for the grating element. It is understood that a single, unitary element is used for both stretching and compressing, the element is desirably an integral, monolithic, single grating element. This is contrary to separate side-by-side, stacked, or spaced-apart conventional configurations.

The advantages of the present stretcher-compressor assembly include compactness, economy, high stretching ratio and good efficiency. These advantages arise from the unique arrangement of the many components of the assembly and because a transmission grating is used instead of a reflection grating. In the transmission mode, the diffracted beam is on the opposite side of the grating. This allows placement of the optical components very close to the grating, making it more compact. The stretching ratio of the stretcher, the ratio of stretched pulse width to the input ultrashort pulse width, depends on the difference f−$L_1$, where f is the focal length of lens 4 in FIG. 4. The larger the value f−$L_1$, the larger the stretching ratio. For compactness, f should not be too large, and $L_1$ should be minimized. In the present transmission mode, the input and diffracted beams are on opposite sides of the grating, therefore obstruction of the input beam by the lens is not a problem. Therefore, one can place the lens very close to the grating to minimize $L_1$. Thus, a very compact design can be realized. This is in direct contrast to the case where one would attempt to use reflection gratings in side-by-side arrangement, such as in U.S. Pat. No. 5,329,398. In reflection mode, the lens cannot be placed too close to the grating, due to physical dimension constraints. If the lens is placed too close to the grating, it would obstruct the input beam.

In the comparative reflection mode, the stretcher and compressor are spaced apart or in side-by-side arrangement. The side-by-side arrangement in U.S. Pat. No. 5,329,398 poses problems, since a stretcher is stacked on top of a compressor. Here, the input beams of the stretcher and compressor are incident on the grating from the same direction. Therefore, it requires a diffraction grating of large enough vertical size to accommodate both the stretcher and compressor. In a preferred embodiment, a reflection grating of 2"(H)×4"(V) is necessary to provide a relatively large separation between stacked stretcher and compressor. In the present invention, however, the input beams of the stretcher and compressor strike the grating from different directions, no vertical separation of the stretcher and compressor is needed. The dispersed beams of the stretcher and compressor can actually overlap each other on the grating. This is a very efficient use of the grating. There is no special requirement on the vertical dimension of the grating. Since the cost of grating increases very rapidly with the grating size, the present invention is more economical. In one embodiment, the entire stretcher/compressor assembly, including mirrors and lenses, occupies an area of about 30 cm×50 cm. The transmission grating itself was very small, about 25 mm×75 mm. Smaller gratings are possible. The nominal size used in the present experiments was 25 mm×75 mm and 8 mm thick. This is reducible to 50 mm×5 mm and 5 mm thick. This is a fraction of the size of the smallest side-by-side stretcher and compressor gratings arrangement.

In the comparative reflection mode of spaced-apart or side-by-side reflection gratings, it is extremely difficult to set the incident angle at Littrow angle due to optical component's physical size constraints. The optics for the diffracted beam would obstruct the incident beam. In the present invention, however, this problem is eliminated, since the diffracted beam is on the opposite side of the grating. The operation of the grating at Littrow angle is very desirable because it gives the highest diffraction efficiency. In the implementation of the invention, a diffraction efficiency ~95% at Littrow angle is obtained, and even higher efficiency gratings are available. For typical gold-coated reflection gratings, the efficiency is ~91%. Because the laser beam strikes the grating 4 times, this can translate into large differences in overall stretcher and compressor throughput.

The use of transmission grating has an added benefit of environmental stableness. Gold-coated reflection gratings are subject to degradation over time due to moisture attack. The high efficiency, unitary, monolithic transmission grating for pulse stretching and compression is protected from air moisture, and does not degrade over time. One design utilizes a composite body having dielectric layers with the grating inscribed between layers. Antireflection (AR) coating on the outer surfaces of the layers helps to minimize losses.

In one embodiment, the beam in the grating setting described earlier is S-polarized. That is, relatively vertically polarized (as depicted in FIG. 4) when it hits the grating. Therefore, the losses without the AR-coating would be greater than 20% per side. The losses with AR-coating are less than 0.2% per side. The invention is not limited to any particular grating body design, as long as such grating functions as a transmission grating. For example, a grating may be curved, that is, have curved surfaces rather than planar. Also, other transmission grating designs may be combinable with P-polarization.

In another embodiment, alternative to FIG. 4, the compressor beam path first pass enters the grating element on the same side as that of the stretcher beam path first pass. FIG. 11 shows a line of symmetry Y for rotation of the compressor assembly elements. Here, the position of mirror 17 is changed to the opposite side of grating 2. Likewise, the positions of mirrors 20 and 25 are moved to the opposite side of grating 2. (See arrows of FIG. 11). In this arrangement, the stretcher beam path first pass and the compressor beam path first pass enter through the same surface from different directions.

As can be seen, the transmission grating provides many advantages compared to a reflection grating, because in transmission the diffracted beam is on the opposite side of the grating from the side the beam enters. Since incoming beam and diffracted beam are on opposite sides, the stretcher/compressor assembly is very compact. For example, in the stretcher, the lens is brought very close to the grating. In contrast, with reflection grating, the diffracted beam is ideally directed as close as possible to the incoming beam. Here, the lens gets in the way. In the compressor beam path of the transmission mode, the mirror is placed very close to the transmission grating because there are effectively two working sides of the grating. This is in contrast to one working side with a reflection grating. A further advantage of transmission mode combined stretcher/compressor assembly is its very high diffraction efficiency. That is, the ratio of light intensity or beam energy of the diffracted beam to that of the incident beam. The assembly of the invention provides high percentage of diffracted (transmitted) light power. In the present invention, the diffraction efficiency, transmission (T), single pass, is 95% or greater.

Another major advantage of the present invention is the single rotation adjustment of the grating to accommodate wavelength shifts of the laser pulse. The present invention, as shown in FIG. 4, clearly provides this advantage. If a grating angle adjustment is needed for the Littrow angle for a different central wavelength of the pulse, the rotation of the grating will give the correct Littrow angle for both the stretcher and the compressor, as is evident from FIG. 4.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

We claim:

1. A combined stretcher and compressor assembly for a pulsed laser beam comprising one or more pulses, said assembly comprising:
   a transmission grating element having first and second surfaces, a thickness between said surfaces, and a grating patterned in or on said grating element;
   said grating element arranged to receive a beam for stretching pulse(s) in a stretcher beam path, and to receive a beam for compressing pulse(s) in a compressor beam path, each of said respective paths passing through said grating element;
   first and second reflecting means arranged to provide a desired number of passes through said grating element by said stretcher beam path;
   third and fourth reflecting means arranged to provide a desired number of passes through said grating element by said compressor beam path.

2. The assembly according to claim 1 arranged to define said stretcher beam path which first passes through said grating element from said first surface to said second surface, with said first reflecting means facing said second surface and said second reflecting means facing said first surface.

3. The assembly according to claim 2 constructed and arranged to define said stretcher beam path through said grating element to said first reflecting means, then through said grating element to said second reflecting means, then through said grating element to said first reflecting means, then through said grating element and out of said assembly.

4. The assembly according to claim 2 arranged to define said compressor beam path which first passes through said grating element from said second surface to said first surface, with said third reflecting means facing said first surface and said fourth reflecting means facing said second surface.

5. The assembly according to claim 4 constructed and arranged to define said compressor beam path through said grating element to said third reflecting means, then through said grating element to said fourth reflecting means, then through said grating element to said third reflecting means, then through said grating element and out of said assembly.

6. The assembly according to claim 2 arranged to define said compressor beam path which first passes through said grating element from said first surface to said second surface, with said third reflecting means facing said second surface and said fourth reflecting means facing said first surface.

7. The assembly of claim 6 constructed and arranged to define said compressor beam path through said grating element to said third reflecting means, then through said grating element to said fourth reflecting means, then through said grating element to said third reflecting means, then through said grating element and out of said assembly.

8. The assembly according to claim 6 wherein said stretcher beam first pass and said compressor beam first pass enter said grating element from different directions relative to said first surface.

9. The assembly according to claim 1 arranged to provide at least 3 passes through said grating element by said stretcher beam path and at least 3 passes through said grating element by said compressor beam path.

10. The assembly according to claim 1 arranged to provide at least 4 passes through said grating element by said stretcher beam path and at least 4 passes through said grating element by said compressor beam path.

11. The assembly of claim 1 comprising focusing means in the stretcher beam path between said grating element and said first reflecting means, aligned in the path of said stretcher beam path at a distance of $L_1$ from said grating element and at a distance f from said first reflecting means, where f is the focal length of said focusing means and where said combined stretcher and compressor assembly is characterized by a stretcher ratio defined as the ratio of stretched pulse width to pre-stretched pulse width, which changes with the difference of f minus $L_1$, whereby as the value of f minus $L_1$ increases, said ratio increases.

12. The assembly according to claim 1 having said grating element and said first and second reflecting means arranged to define said stretcher beam path which passes through said grating element in a first region of said grating element; said grating element and said third and fourth reflecting means arranged to define said compressor beam path, which passes through said grating element in a second region of said grating element; and said first and second regions overlapping.

13. The assembly according to claim 12 wherein said first region is within said second region.

14. The assembly according to claim 12 wherein said first and second regions coincide.

15. The assembly according to claim 1 wherein said stretcher beam path passes through said grating element in a first region of said element, and said compressor beam path passes through said grating element in a second region; said first and second regions overlapping; whereby said grating element is more compact than comparative grating elements having a stretcher element and a compressor element arranged side-by-side or spaced apart, and which is operable to provide a diffraction efficiency which is at least as great as the diffraction efficiency obtained by said comparative elements.

16. A combined stretcher and compressor assembly for a pulsed laser beam comprising one or more pulses, said assembly comprising: a transmission grating element comprising dielectric material, having first and second surfaces, a thickness between said surfaces, and a grating patterned in or on said grating element; said grating element arranged to receive a beam for stretching pulse(s) in a stretcher beam path, and to receive a beam for compressing pulse(s) in a compressor beam path, each of said respective paths passing through said grating element; first and second reflecting means arranged to provide a desired number of passes through said grating element by said stretcher beam path; third and fourth reflecting means arranged to provide a desired number of passes through said grating element by said compressor beam path.

17. The assembly according to claim 16 wherein said grating element is in the form of a composite body having a first layer of dielectric material and a second layer of dielectric material which overlies said first layer, and said grating patterned on an inner surface of one of said layers.

18. The assembly according to claim 16 wherein said transmission grating element operating in transmission deflection mode provides a diffraction efficiency at least as great as reflection gratings operating in reflection mode in spaced apart or side-by-side arrangement.

19. The assembly according to claim 16 wherein said third reflecting means is a retroreflector.

20. The assembly according to claim 19 wherein said retroreflector is a roof mirror or prism.

* * * * *